United States Patent [19]
Braun

[11] Patent Number: 4,781,363
[45] Date of Patent: Nov. 1, 1988

[54] VIBRATION ISOLATOR PARTICULARLY OF THE ANTIRESONANCE FORCE TYPE

[75] Inventor: Dieter Braun, Oberpframmern, Fed. Rep. of Germany

[73] Assignee: Messerschmitt-Bolkow-Blohm Gesellschaft mit beschränkter Haftung, Munich, Fed. Rep. of Germany

[21] Appl. No.: 426,641

[22] Filed: Sep. 29, 1982

Related U.S. Application Data

[63] Continuation of Ser. No. 125,449, Feb. 28, 1980, abandoned.

[30] Foreign Application Priority Data

Mar. 1, 1979 [DE] Fed. Rep. of Germany ....... 2907926
Dec. 20, 1979 [DE] Fed. Rep. of Germany ....... 2951526

[51] Int. Cl.⁴ .................... F16F 7/10; F16F 9/16; F16F 13/00
[52] U.S. Cl. ..................... 267/225; 188/380; 267/122; 267/136; 267/140.1; 267/151; 416/140
[58] Field of Search ............... 188/378, 379, 380, 298; 267/225, 221, 22 R, 23, 24, 64.23, 118, 122, 136, 151, 240.1; 416/500, 106, 107, 140 A, 140, 145

[56] References Cited

U.S. PATENT DOCUMENTS

| 1,622,892 | 3/1927 | Wadsworth | 267/64.23 |
| 2,635,838 | 4/1953 | Branson | 188/378 |
| 2,919,883 | 1/1960 | Murphy | 267/122 X |
| 2,973,968 | 3/1961 | Behles | 267/64.23 |
| 3,168,278 | 2/1965 | Ogden | 188/298 X |
| 3,288,226 | 11/1966 | Lemont, Jr. et al. | 416/140 A |
| 3,295,846 | 1/1967 | Robertson | 188/378 |
| 3,361,216 | 1/1968 | Walker | 188/298 X |
| 4,088,042 | 5/1978 | Desjardins et al. | 188/378 |

FOREIGN PATENT DOCUMENTS

| 781817 | 4/1968 | Canada . | |
| 575715 | 5/1933 | Fed. Rep. of Germany | 267/8 R |
| 605668 | 11/1934 | Fed. Rep. of Germany | 267/23 |
| 2836662 | 10/1979 | Fed. Rep. of Germany | 267/22 R |
| 1055998 | 10/1953 | France | 188/298 |

Primary Examiner—George E. A. Halvosa
Attorney, Agent, or Firm—Toren, McGeady & Associates

[57] ABSTRACT

A vibration isolator is formed with a spring mechanism and a fluid transmission mechanism interposed between a vibrating member and a support member. The fluid transmission mechanism includes a primary fluid chamber and a secondary fluid chamber, with the secondary fluid chamber being deformed to a greater extent than the primary fluid chamber as a result of vibrations. An inertia mass operatively associated with the secondary fluid chamber is displaced as a result of vibrations and is thereby accelerated with a resulting inertia force causing fluid pressure change in the fluid transmission mechanism which compensates as a dynamic force the dynamic portion of the spring force transmitted from the spring mechanism to the support member.

17 Claims, 6 Drawing Sheets

VIBRATION ISOLATOR PARTICULARLY OF THE ANTIRESONANCE FORCE TYPE

This is a continuation of Ser. No. 125,449, filed Feb. 28, 1980, now abandoned.

The present invention relates generally to a vibration damping device and more particularly to a vibration isolator for reducing the transmission of vibrations from a periodically vibrating part to a support connected thereto. The vibration isolator of the invention is of the type wherein, in the case of antiresonance, vibrations are essentially no longer transmitted to the support.

The vibration isolator of the invention can be used in all cases in which a periodic excitation is to be isolated, as is particularly the case in piston engines, such as ship engines, motor vehicle engines, reciprocating or piston compressors, reciprocating pumps and the like, and in helicopters wherein vibrations from the rotary wings are to be prevented from acting on the cell.

As a rule, a plurality of isolators are arranged between the periodically vibrating part and the support in order to isolate against vibrations of several degrees of freedom. The vibrations can also be introduced at the support, and in this case the previously periodically vibrating part will assume the function of the support.

Antiresonance force isolators which can be arranged between the transmission and the cell of a helicopter are known in the art, and the number of isolators depends upon the principal axis directions in which vibrations are transmitted. An antiresonance force isolator consists of a parallel arrangement of a spring and a passive force generator. The arrangement is adjusted in such a manner that dynamic forces are locally cancelled at the fastening point on the cell, so that isolation of the cell from the vibrations of the rotor will be achieved.

A pendulum with a mechanical lever transmission has been used as the passive force generator (U.S. Pat. No. 3,322,379). This purely mechanical force isolator requires a relatively large amount of space, it produces high wear of the lag hinges and the technical realisation is complicated. The finite distance between the spring force and the pendulum bearing force required for operation results in a force couple which occurs, among other places, on the side of the support as a dynamic moment. This moment is undesirable in many applications, particularly when it acts on a helicopter cell.

Furthermore, it is known to arrange a fluid-filled deformable space or chamber between the vibrating part and the support with the chamber being connected to a cylinder in which a weight forming a free piston is arranged on the fluid (see Canadian Pat. No. 781,817 particularly FIG. 6 thereof). This known force isolator has the disadvantage that frictional forces occur between the piston and the cylinder and that flow losses occur due to the conduction of fluid. This requires that a damping element be arranged parallel to the isolator which significantly reduces the isolation efficiency. In addition, when overly high accelerations occur, fluid evaporates in the fluid chamber due to expansion during half of the periodic sequence of movements, thereby further impairing the effectiveness of the isolator.

The invention is directed toward the task of constructing a vibration isolator, particularly an antiresonance force isolator of the type described, which is a practical, compact component and which operates essentially without wear.

SUMMARY OF THE INVENTION

Briefly, the present invention may be described as a vibration isolator for reducing transmission of vibrations between a periodically vibrating member and a support member connected therewith and operative to essentially terminate vibration transmission in the case of antiresonance, said isolator comprising spring means interposed between the vibrating member and the support member, fluid transmission means including primary fluid chamber means and secondary fluid chamber means both deformable in the direction of movement of the vibrations, the secondary fluid chamber means having an effective cross-sectional area which is smaller than the effective cross-sectional area of the primary fluid chamber means, the secondary fluid chamber means being thereby deformed to a greater extent than the primary fluid chamber means as a result of the vibrations, and inertia mass means operatively associated with the second fluid chamber means so as to be displaced as a result of the vibrations, the inertia mass means being thereby accelerated with the resulting inertia force causing fluid pressure change in the fluid transmission means which compensates as a dynamic force, the dynamic portion of the spring force transmitted from the spring means to the support.

In accordance with the invention, the primary fluid chamber means may consist of at least one primary fluid chamber which is deformable in the direction of movement of the vibrations and the second fluid chamber means may also consist of at least one secondary chamber which is also deformable in the direction of movement of the vibrations and whose effective cross section is smaller than that of the primary fluid chamber. As a result, due to the fluid displaced by the deformation of the primary fluid chamber, the secondary chamber is deformed to a greater extent so that the inertia mass means assigned to it is accelerated and the resulting inertia force causes a pressure change in the fluid which compensates as a dynamic force the dynamic portion of the spring force which is transmitted from the spring to the support.

The vibration isolator according to the invention has the advantage that the inertia force and the spring force act in a single line of action and that a compact construction is possible with respect to weight and mounting space. Bearings which are subject to wear are not required. The primary fluid chamber system arranged parallel to the isolator spring also allows relative movement of the spring fastening points which are not situated on the principal axis of action.

In the operation of the antiresonance force isolator according to the invention which is provided with a hydraulic transmission, the stroke of the primary fluid chamber caused by the periodic relative movement of the vibrating part relative to the support creates a stroke of the secondary chamber which is larger in proportion to the ratio between the effective cross sections. The inertia force resulting from the acceleration of the inertia mass causes a pressure change in the fluid which acts as a dynamic force on the vibrating part or on the support. This dynamic force is utilized at the support for cancelling the dynamic portion of the spring force acting from the isolator spring on the support. With a properly adjusted system, and in the ideal case in which it is assumed that there is no friction or damping, at a certain excitation frequency, i.e. the antiresonance frequency, a complete cancellation or isolation of the dynamic forces is achieved at the support of the isolator; to wit, for example, at the fastening point on the cell of a helicopter when the isolator fastening point at the transmission is the vibrating part.

Advantageously, the secondary chamber is filled with fluid and follows the primary fluid chamber in the direction of movement of the vibrations. In this embodiment which requires only a narrow mounting space, to avoid damping in the fluid resulting from flow losses due to sudden changes in the cross section, the transition from the primary fluid chamber to the secondary fluid-filled chamber should be constructed so as to cause low flow losses, i.e., the transition should have a rounded contour.

With the secondary chamber located within the primary fluid chamber in order to reduce the structural length of the vibration insulator, the secondary chamber is connected to the ambient atmosphere. It may also be closed and possibly be filled with a compressible medium having a positive or negative pressure. To further reduce the required space, the primary fluid chamber may have a deformable section and a rigid section which, compared to the deformable section, may also have a smaller cross section and surround at least a portion of the secondary chamber to form a fluid-filled annular chamber.

To avoid a negative pressure in the fluid—which conventionally consists of a liquid of low viscosity, such as a water/alcohol mixture—which negative pressure may result in an increase of the entire volume of the fluid chamber arrangement and thus possibly impair its effectiveness, a spring is provided which acts on the pendulum weight and on the support or the vibrating part and is prestressed to increase the fluid pressure. The initial stress of the spring is dimensioned in such a way that the overall fluid volume is not increased during operation.

In accordance with an alternative measure for avoiding negative pressure, a second system having a primary fluid chamber and a secondary chamber is provided, wherein the primary fluid chambers and the secondary chambers of the first and second systems are rigidly coupled to each other by means of connecting members and jointly accelerate the inertia mass, with the volume of the secondary chamber being reduced while that of the other secondary chamber is increased accordingly, and while the volumes of the primary fluid chambers behave inversely.

In one embodiment of the invention, the connecting member of the secondary chambers can be a rod which supports the inertia mass and extends through the secondary chambers.

The primary fluid chamber and the secondary chamber may be cylindrical, corrugated metal bellows or membrane bellows which are deformable with low friction in the axial direction.

By way of a structural simplification the spring acting between the vibrating part and support may be the primary fluid chamber itself constructed as a metal bellows having the required inherent stiffness.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Referring now to the drawings, wherein like reference numerals refer to similar parts throughout the various figures thereof, antiresonance force isolators in accordance with the invention illustrated in FIGS. 1 through 5 each have a vibration member 1 introducing vibrations into the assembly. The member 1 may, for example, be the fastening point of the isolator to the transmission of a helicopter. The vibrating member 1 is connected through an isolator spring 2 to a support 4 which, when mounted in a helicopter, is a fastening point on the cell. Of course, vibrations can also be introduced through the support 4. In this case, the member 1 assumes the function of the support.

In the illustrated embodiment, the isolator spring consists of a circular spring of glass fiber-reinforced plastic material. However, leaf or plate springs, helical springs or other spring elements can also be used. The isolator spring can possibly be omitted when the inherent stiffness of the system of deformable chambers, to be described hereinafter, is sufficient.

Primary fluid chamber means comprising a system of one or two primary fluid chambers 3 which consists of cylindrical, corrugated metal bellows which are deformable in the axial direction is arranged parallel to the isolator spring 2. Secondary fluid chamber means comprising a system with one or two secondary deformable chambers 5 which also consist of metal or membrane bellows, partially illustrated in FIG. 1, and whose cross sections are smaller than those of the primary fluid chambers 3, is guided, in FIGS. 1 through 4, in the axial direction by a bearing 8 having a low friction coefficient. The bearing 8 may consist, for example, of a ball box or spherical bushing. At the free end of the secondary bellows system there is fastened an inertia mass 9, which may consist of a plurality of disks to enable adjustment thereof.

Figure 1:
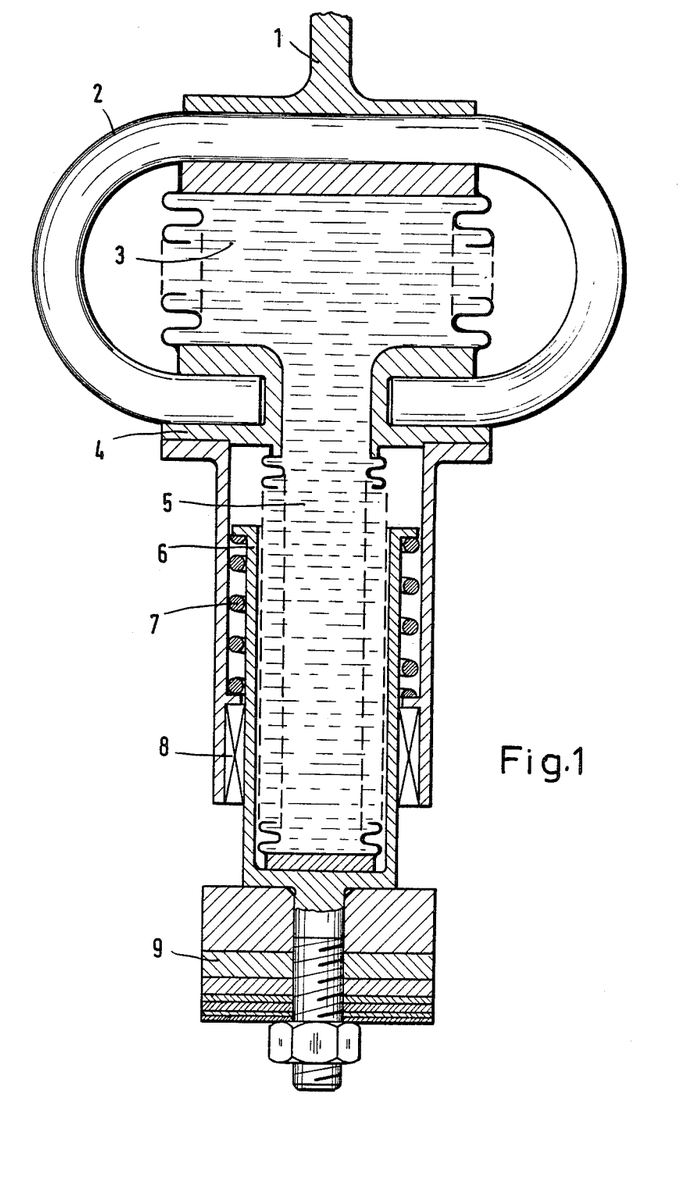
FIG. 1 is a schematic sectional view of a first embodiment of an antiresonance force isolator according to the invention.

In the embodiment illustrated in FIG. 1, the fluid chamber of the primary bellows 3 leads through a rounded annular edge into the interior of the secondary bellows 5 which is also filled with liquid. At its free end, the secondary bellows is connected to a connecting element 6 which consists of a bushing which surrounds the bellows, with play being provided therebetween. A spring 7 bears with one end against the bushing and at its other end acts on an internal flange of the support 4 above the bearing 8 in such a manner that the inertia mass 9 is prestressed in the illustrated position of rest. The initial stress is dimensioned in such a way that the volume in the fluid chamber does not increase during the operation of the isolator.

Figure 2:
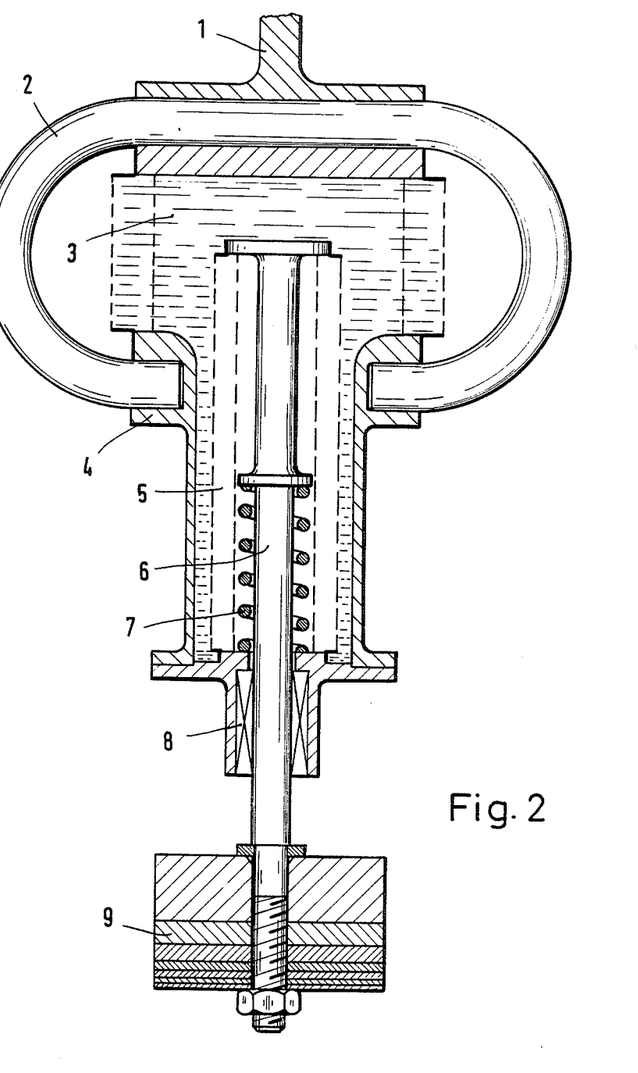
FIG. 2 is a sectional view showing a modification of this embodiment.

In the embodiment illustrated in FIG. 2, the secondary bellows 5 is arranged in the interior of the fluid chamber defined by the primary bellows 3. On its end face at the support, the interior of the secondary bellows 5 is connected to the atmosphere. The fluid chamber defined by the primary bellows 3 consists of a first section which is axially deformable, and of a second, rigid section whose cross section is reduced as compared to that of the first deformable section in order to save space. The rigid section surrounds a portion of the secondary bellows 5, wherein the annular chamber remaining therebetween is filled with fluid which is connected to the interior of the primary bellows 3.

The connecting element 6 consists of a rod from which the inertia mass 9 is suspended. The rod is guided in a bearing 8 of the support and it is fastened to that end face of the secondary bellows 5 which is located in the interior of the primary bellows 3. The spring 7 is arranged between the support 4 and a collar of the rod 6 inside the interior of the secondary bellows 5, which is connected to the atmosphere.

In the operation of the embodiments of the antiresonance force isolator illustrated in FIGS. 1 and 2, when the isolator spring is compressed, the volume of the primary bellows 3 is reduced. In the embodiment according to FIG. 1 the secondary bellows 5 is extended and in the embodiment according to FIG. 2 it is compressed. As a result, the inertia mass 9 which is connected through the connecting member 6 to the lower (FIG. 1) or the upper (FIG. 2) end of the secondary bellows 5 is moved downwardly. The closer the inertia mass 9 comes to the lower dead center of the periodic sequence of movements, the stronger the mass 9 is decelerated, i.e. the larger becomes the downwardly directed inertia force acting on the mass. This inertia force causes a pressure reduction within the bellows system. This results in an upwardly directed force on the support 4. The dynamic portion of the force which acts from the isolator spring 2 on the support 4 is directed downwardly at this point in time.

With a proper adjustment of the isolator, for a certain excitation frequency, i.e. the antiresonance frequency, the sum of the dynamic forces acting on the support 4 equals zero, i.e. the support 4 remains at rest. The initial stress of the spring 7 is selected such that the total volume of the bellows system is not increased during the phase of movements under consideration. The spring 7 can be omitted when the occurring inertia forces are sufficiently small.

In the embodiments according to FIGS. 1 and 2, the spring 7 can also be omitted when the function of this spring can be assumed by a compressible medium in the secondary chamber 5 according to FIG. 2 or by a closed jacket (not shown) surrounding the secondary chamber 5 in the device according to FIG. 1.

Figure 3:
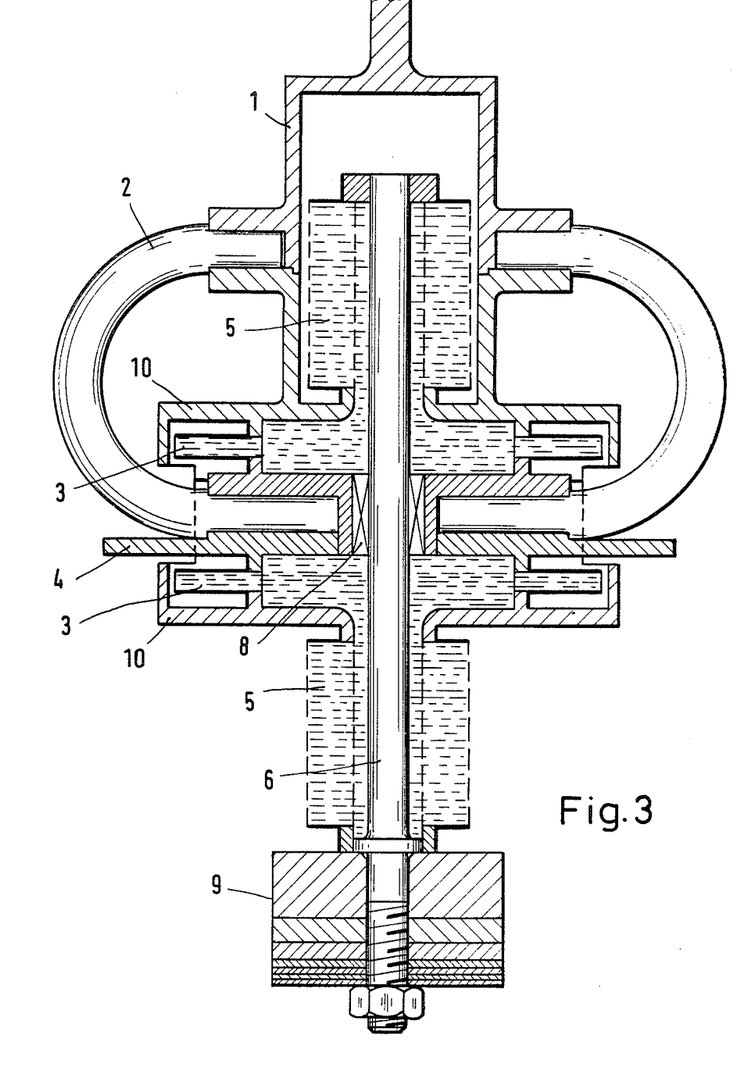
FIG. 3 is a sectional view showing a second embodiment of an antiresonance force isolator.
Figure 4:
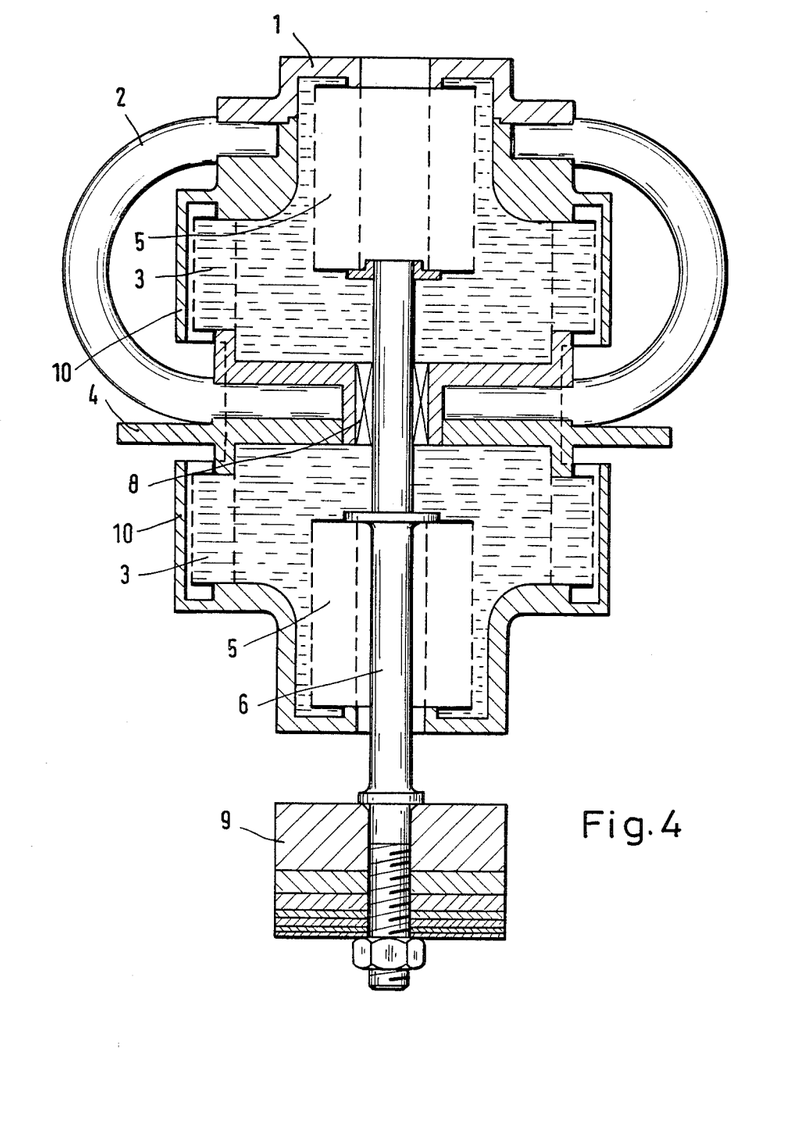
FIG. 4 is a sectional view showing a modification of the embodiment of FIG. 3.

In the embodiments of the antiresonance force isolator illustrated in FIGS. 3 and 4, a twofold bellows system is provided. Each bellows system of the embodiment according to FIG. 3 corresponds to the bellows system of FIG. 1, and each bellows system of the embodiment according to FIG. 4 corresponds to the bellows system according to FIG. 2. In these embodiments, the primary bellows 3 are rigidly connected to each other through a connecting member 10, while the rigid connection of the secondary bellows 5 consists of a connecting rod 6 extending therethrough on which the inertia mass 9 is mounted.

When the isolator spring 2 of the embodiments according to FIGS. 3 and 4 is compressed, the volume of the upper primary bellows 3 is reduced. Since the upper end of the upper primary bellows 3 is connected through the connecting member 10 with the lower end of the lower primary bellows 3, the volume of the lower primary bellows 3 increases by the same extent. As a result, the upper secondary bellows 5 of the embodiment according to FIG. 3 is extended, and that of the embodiment according to FIG. 4 is compressed, while the lower secondary bellows 5 of the embodiment according to FIG. 3 is compressed and that of the embodiment according to FIG. 4 is extended.

The connecting rod 6 which is connected to the two secondary bellows 5 moves upwardly together with the inertia mass 9. The closer the inertia mass comes to the upper dead center, the stronger it is decelerated. The resulting, upwardly directed inertia force increases. Thus, the pressure in the lower bellows system increases and the pressure in the upper bellows system decreases. These pressure changes result in an upwardly directed force on the support 4. The force acting from the isolator spring 2 on the support 4 is directed downwardly at this point in time.

With the proper adjustment, for a certain excitation frequency, namely the antiresonance frequency, the two forces cancel each other, i.e. the support 4 remains at rest.

The double bellows system ensures that at any point in time of the periodic sequence of movements, a pressure increase takes place in one of the two bellows systems, so that a volume increase cannot occur in either of the two systems. The thermal expansion of the fluid can be compensated, for example, through a choke bore and a small bellows (not shown) connected to the bore.

In the embodiments according to FIGS. 3 and 4, the isolator spring 2 can be omitted when its function is assumed by an appropriate gas spring effected by a compressible medium which, in FIG. 3, is arranged in a closed jacket surrounding at least one of the secondary chambers 5 or which, in FIG. 4, is arranged in at least one of the secondary chambers 5.

Figure 5:
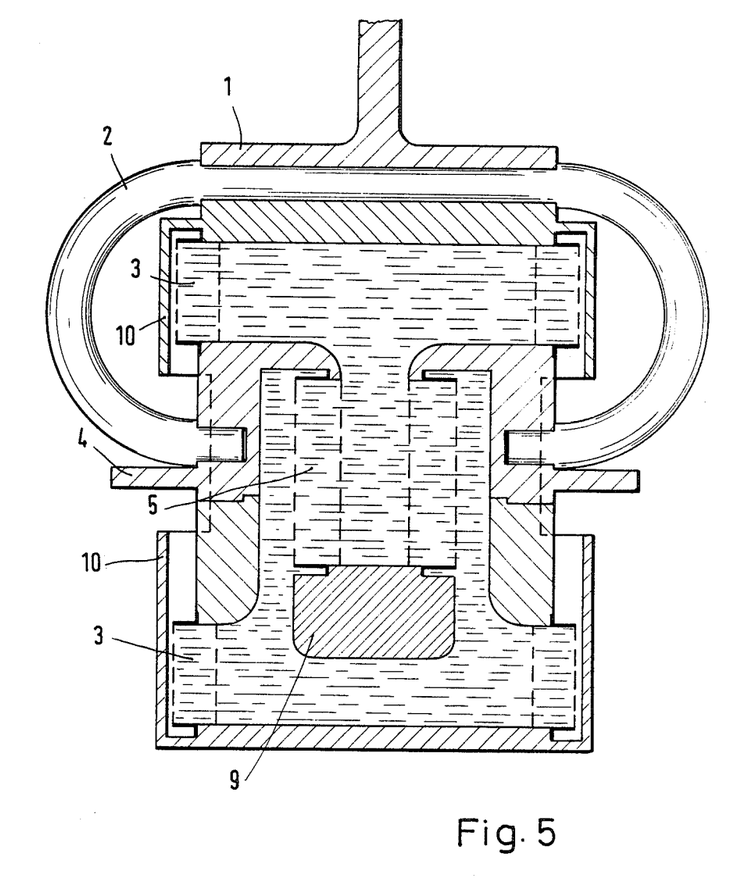
FIG. 5 is a sectional view showing another modification.

In principle, the arrangement illustrated in FIG. 5 operates in a similar manner as the one illustrated in FIGS. 3 and 4. When the isolator spring 2 is compressed, the volume of the upper primary bellows 3 is reduced. Since its upper end is connected through the connecting member 10 to the lower end of the lower primary bellows 3, the volume of this bellows 3 increases by the same extent. Thus, the secondary bellows 5 which is the same for both systems is extended, and the inertia mass 9, which in this case is directly connected to the lower end of the secondary bellows 5, moves downwardly. The closer the inertia mass 9 comes to the lower dead center, the more it is decelerated. The resulting downwardly directed inertia force increases. Further operating procedures correspond to those described in connection with FIGS. 3 and 4. The last-described arrangement (according to FIG. 5) requires one bellows fewer than the arrangement according to FIGS. 3 and 4.

Figure 6:
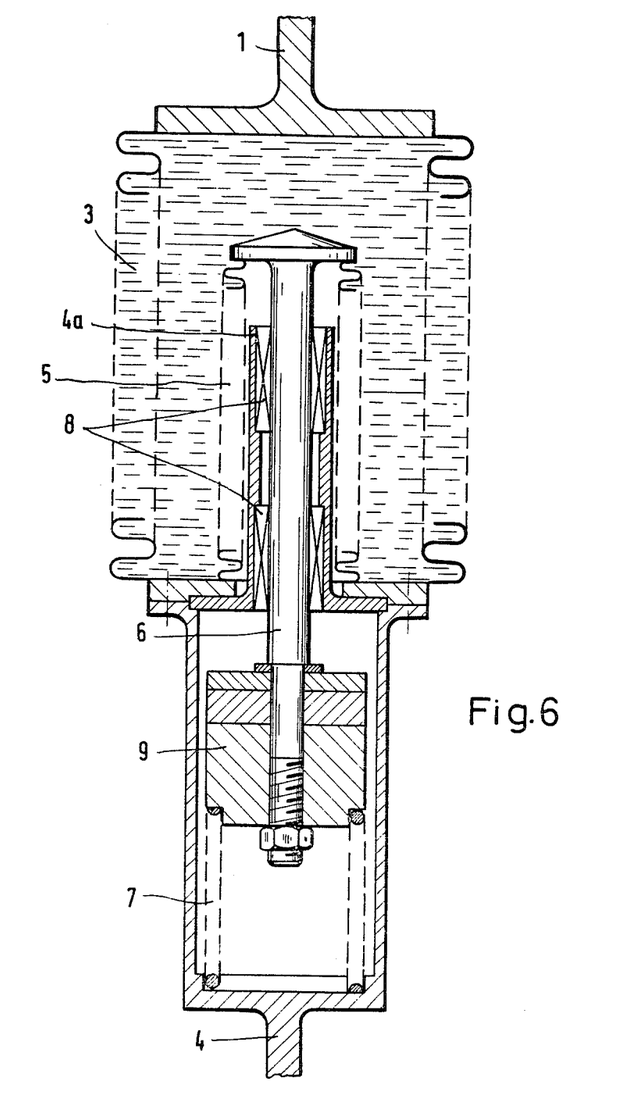
FIG. 6 is a sectional view showing another modification of the embodiment according to FIG. 2.

The antiresonance force isolator illustrated in FIG. 6 has a member 1 whereby vibrations are introduced into the system. This member may, for example, be the fastening point of the isolator to the transmission of a helicopter. The vibrating member 1 is connected through a metal bellows 3 to a support 4 which, when arranged in a helicopter, is the fastening point at the cell. Of course, the vibrations can also be introduced through the support 4. In this case, the member 1 assumes the function of the support.

The inherent stiffness of the metal bellows 3 is selected in such a way that the metal bellows 3 assumes the function of the spring between the vibrating part and the support 4, so that an isolator spring 2 can be omitted, thereby significantly simplifying the overall construction of the antiresonance force insolator.

The metal bellows 3 surrounds the primary fluid chamber in which there is arranged a secondary metal bellows 5 having a cross section which is smaller than that of the metal bellows 3. At the end face of the secondary bellows 5 located in the fluid chamber surrounded by the primary metal bellows, there acts a rod 6 which serves as a connecting element. The rod 6 is axially slidably guided in low friction bearings 8 which are arranged in a bushing 4a which projects upwardly from the support 4 in the interior of the secondary bellows 5. The interior of the secondary bellows 5 is connected to the atmosphere at its end face facing toward the support. Outside of the secondary bellows 5, an inertia mass 9 is suspended from the rod 6. A spring 7 acts on the end face of the inertia mass 9 which faces away from the secondary bellows 5, the spring 7 being supported on the support 4 which widens in a sleeve-like manner and presses the inertia mass 9 in the direction of the secondary bellows 5.

In the operation of the antiresonance force isolator, when the primary metal bellows 3—which assumes the function of the isolator spring and has a sufficient inherent stiffness—is compressed, its volume is reduced. Simultaneously, the secondary bellows 5 is compressed. As a result, the inertia mass 9, which is connected through the rod 6 to the upper end of the secondary bellows 5, moves downwardly. The closer the inertia mass 9 comes to the lower dead center of the periodic sequence of movements, the stronger the inertia mass 9 is decelerated, i.e. the larger becomes the downwardly directed inertia force acting on the mass. This inertia force causes a pressure reduction within the bellows system. This results in an upwardly directed force on the support 4. The dynamic portion of the force acting from the resiliently elastic metal bellows 3 on the support 4 is directed downwardly at this point in time. With a proper adjustment of the isolator for a certain excitation frequency, i.e. the antiresonance frequency, the sum of the dynamic forces acting on the support 4 equals zero, i.e. the support 4 remains at rest. The initial stress of the spring 7 is selected in such a way that the total volume of the bellows system is not increased during the phase of movements under consideration.

While specific embodiments of the invention have been shown and described in detail to illustrate the application of the inventive principles, it will be understood that the invention may be embodied otherwise without departing from such principles.

What is claimed is:

1. A vibration isolator system adapted to be adjusted so that at a given antiresonance frequency vibration transmission is virtually completely suppressed between a vibrating member and a support member comprising:
   first and second connecting members adapted to be connected respectively to said vibrating member and to said support member;
   isolator spring means interposed between said first and second connecting members;
   a closed hydraulic pressure system containing a liquid comprising operatively joined primary fluid chamber means and secondary fluid chamber means both deformable in the direction of movement of said vibrations, said secondary fluid chamber means having an effective cross-sectional area which is smaller than the effective cross-sectional area of said primary fluid chamber means, said secondary fluid chamber means being thereby deformed in the direction of movement of said vibrations to a greater extent than said primary fluid chamber means;
   inertia mass means attached to said secondary fluid chamber means so as to be displaced upon deformation of said secondary fluid chamber means as a result of said vibrations, said inertia mass means being thereby accelerated to generate a resulting inertia force causing fluid pressure change in said fluid pressure system which compensates as a dynamic force the dynamic portion of the forces transmitted between said first and second connection members; and
   means for increasing the fluid pressure within said hydraulic pressure system in the static condition of said isolator system when no vibrations occur and for preventing said fluid pressure from decreasing below a predetermined limit during occurrence of said vibrations.

2. A vibration isolator system adapted to be adjusted so that at a given antiresonance frequency vibration transmission is virtually completely suppressed between a vibrating member and a support member comprising:
   first and second connecting members adapted to be connected respectively to said vibrating member and to said support member;
   isolator spring means interposed between said first and second connecting members;
   a closed hydraulic pressure system containing a liquid comprising operatively joined primary fluid chamber means and secondary fluid chamber means both deformable in the direction of movement of said vibrations, said secondary fluid chamber means having an effective cross-sectional area which is smaller than the effective cross-sectional area of said primary fluid chamber means, said secondary fluid chamber means being thereby deformed in the direction of movement of said vibrations to a greater extent than said primary fluid chamber means;
   inertia mass means positively coupled to said first connecting member by means of said hydraulic pressure system and attached to said secondary fluid chamber means so as to be displaced upon deformation of said secondary fluid chamber means as a result of and to a greater extent than relative movement between said first and second connecting members;
   means for maintaining the overall volume of said hydraulic pressure system generally constant;
   said inertia mass means being accelerated as a result of said relative movement to develop a resulting intertia force causing fluid pressure change in said hydraulic pressure system which compensates as a dynamic force the dynamic portion of the spring forces transmitted between said first and second connecting members.

3. A vibration isolator system adapted to be adjusted so that at a given antiresonance frequency vibration transmission is virtually completely suppressed between a vibrating member and a support member comprising:

first and second connecting members adapted to be connected respectively to said vibrating member and to said support member;

isolator spring means interposed between said first and second connecting members;

a closed hydraulic pressure system containing a liquid comprising operatively joined primary fluid chamber means and secondary fluid chamber means both deformable in the direction of movement of said vibrations, said secondary fluid chamber means having an effective cross-sectional area which is smaller than the effective cross-sectional area of said primary fluid chamber means, said secondary fluid chamber means being thereby deformed in the direction of movement of said vibrations to a greater extent than said primary fluid chamber means;

inertia mass means positively coupled to said first connecting member by means of said hydraulic pressure system and attached to said secondary fluid chamber means so as to be displaced upon deformation of said primary and secondary fluid chamber means as a result of and to a greater extent than relative movement between said first and second connecting members; and means for maintaining the overall volume of said hydraulic pressure system substantially constant, said means for maintaining consisting essentially of secondary spring means arranged in the static condition of said system to generate a preload creating an increase of the static hydraulic pressure in said hydraulic pressure system, the preload of said secondary spring means being so dimensioned that in operation no enlargement of the overall volume of said hydraulic pressure system results;

said inertia mass means being accelerated as a result of said relative movement between said connecting members to develop a resulting inertia force causing fluid pressure change in said hydraulic pressure system which compensates as a dynamic force the dynamic portion of the spring forces transmitted between said first and second connecting members.

4. A vibration isolator system adapted to be adjusted so that at a given antiresonance frequency vibration transmission is virtually completely suppressed between a vibrating member and a support member comprising:

first and second connecting members adapted to be connected respectively to said vibrating member and to said support member;

isolator spring means interposed between said first and second connecting members;

a first closed hydraulic pressure system containing a liquid comprising operatively joined primary fluid chamber means and secondary fluid chamber means both deformable in the direction of movement of said vibrations, said secondary fluid chamber means having an effective cross-sectional area which is smaller than the effective cross-sectional area of said primary fluid chamber means, said secondary fluid chamber means being thereby deformed in the direction of said vibrations to a greater extent than said primary fluid chamber means;

inertia mass means positively coupled to said first connecting member by means of said hydraulic pressure system and attached to said secondary fluid chamber means so as to be displaced upon deformation of said primary and secondary fluid chamber means as a result of and to a greater extent than relative movement between said first and second connecting members; and means for maintaining the overall volume of said hydraulic pressure system substantially constant, said means for maintaining consisting essentially of a second closed hydraulic pressure system containing a liquid comprising second primary fluid chamber means and second secondary fluid chamber means both deformable in the direction of movement of said vibrations, said second secondary fluid chamber means having an effective cross-sectional area which is smaller than the effective cross-sectional area of said second primary fluid chamber means, said second secondary fluid chamber means being thereby deformed in the direction of movement of said vibrations to a greater extent than said second primary fluid chamber means;

said second primary fluid chamber means being rigidly connected with said primary fluid chamber means such that volume changes in said primary fluid chamber means result in inverse volume changes in said second primary fluid chamber means;

said second secondary fluid chamber means being rigidly connected with said secondary fluid chamber means such that volume changes in said secondary fluid chamber means result in inverse volume changes in said second secondary fluid chamber means, whereby in operation no enlargement of the overall volume of both said first and said second hydraulic pressure system results;

said inertia mass means being accelerated as a result of said relative movement between said connecting members to develop a resulting inertia force causing fluid pressure change in said first hydraulic pressure system which compensates as a dynamic force the dynamic portion of the spring forces transmitted between said first and second connecting members.

5. A vibration isolator according to claim 3 or 4 wherein the transition from said primary fluid chamber means to said secondary fluid chamber means is constructed so as to minimize fluid flow losses.

6. A vibration isolator according to claim 3 wherein said secondary fluid chamber means is arranged within said primary fluid chamber means.

7. A vibration isolator according to claim 6 wherein said primary fluid chamber means includes a deformable section and a rigid section which surrounds at least a portion of said secondary fluid chamber means so as to form a fluid-filled annular chamber.

8. A vibration isolator according to claim 7 wherein said rigid section of said primary fluid chamber means is formed with a cross section which is smaller than the effective cross section of said deformable section.

9. A system according to claim 3 wherein said secondary spring means are operatively interposed between one of said first and second connecting members and said inertia mass means.

10. A system according to claim 3 or 4 wherein said isolator spring means is formed as said primary fluid chamber means, said primary fluid chamber means comprising a metallic bellows having an inherent stiffness providing a required spring force.

11. A system according to claim 3 or 4 wherein said primary and secondary fluid chamber means each comprise a generally cylindrical bellows chamber arranged coaxially relative to each other about an axis with said inertia mass means being connected with said secondary fluid chamber means with the mass thereof being arranged generally symmetrically about said axis.

12. A system according to claim 3 wherein said primary and secondary fluid chamber means are arranged coaxially relative to each other about an axis, wherein said inertia mass means is connected with said secondary fluid chamber means having the mass thereof being arranged generally symmetrically about said axis and wherein said isolator spring means and said secondary spring means are both arranged generally symmetrically about said axis.

13. A system according to claim 3 wherein said primary fluid chamber means and said secondary fluid chamber means are formed of cylindrical corrugated bellows deformable in the axial direction thereof.

14. A system according to claim 4 wherein said inertia mass means is connected with said secondary fluid chamber means by a connecting rod, said connecting rod also extending to connect together opposed ends of said secondary fluid chamber means and said second secondary fluid chamber means.

15. A system according to claim 4 wherein said secondary fluid chamber means and said secondary fluid chamber means are both formed by a common deformable member.

16. A system according to claim 4 wherein both said first hydraulic pressure system and said second hydraulic pressure system operate jointly to accelerate said inertia mass means during operation of said vibration isolator system.

17. A system according to claim 4 wherein said primary and secondary fluid chamber means and said second primary and secondary fluid chamber means are formed of cylindrical corrugated bellows deformable in the axial direction thereof.

* * * * *